Dec. 22, 1925.
J. F. O'CONNOR
FRICTION SHOCK ABSORBING MECHANISM
Filed Nov. 13, 1922   3 Sheets-Sheet 1
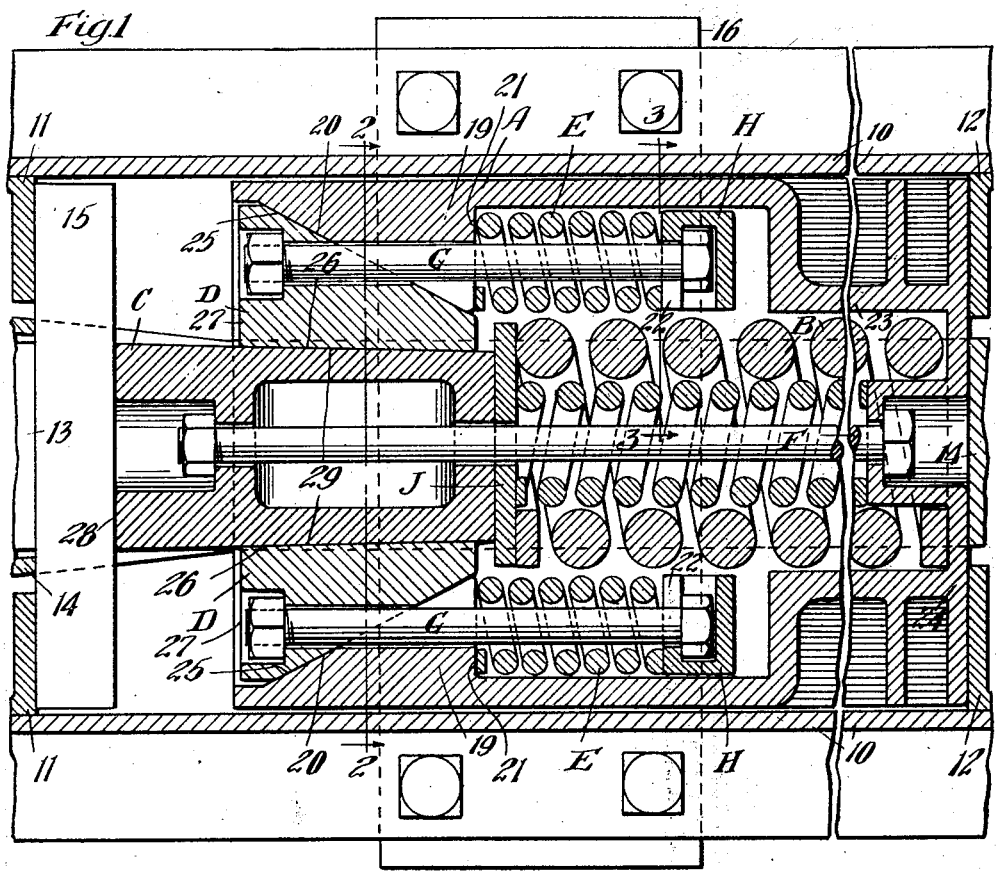
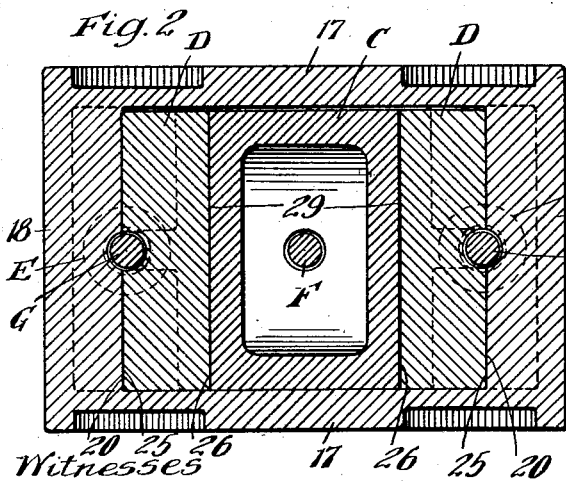
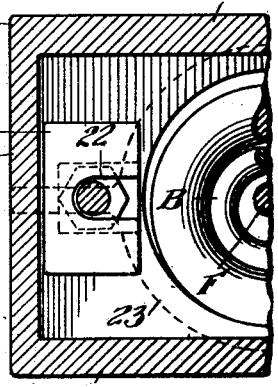
Witnesses
Wm. Geiger
Inventor
John F. O'Connor
By Geo. I. Haight
his Atty.

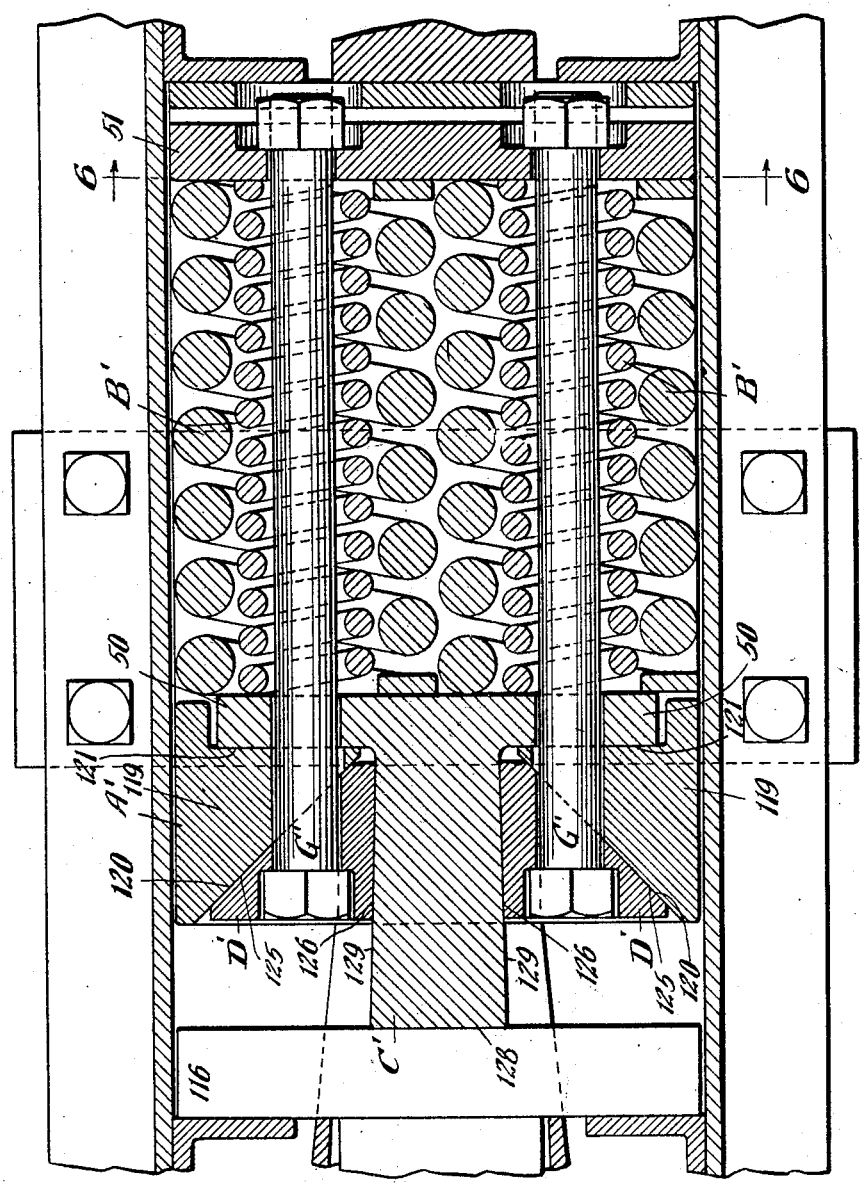

Dec. 22, 1925.                                            1,566,683
                         J. F. O'CONNOR
                FRICTION SHOCK ABSORBING MECHANISM
                    Filed Nov. 13, 1922      3 Sheets-Sheet 3
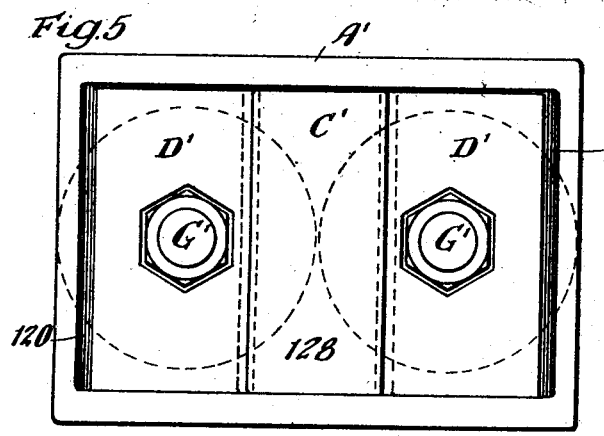
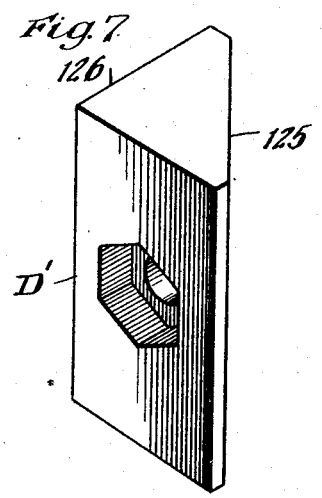
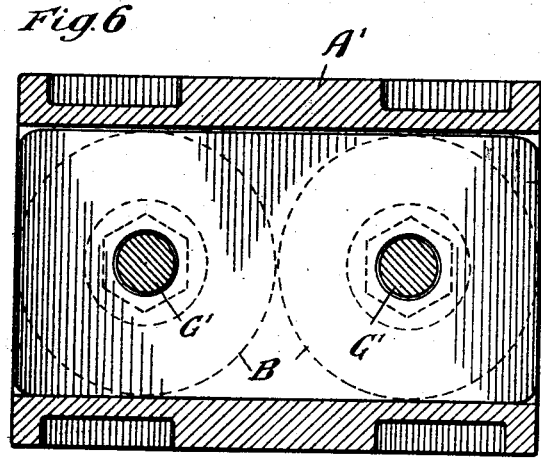
Witnesses
Wm. Geiger
Inventor
John F. O'Connor
By Geo. I. Haight
         his Atty.

Patented Dec. 22, 1925.

1,566,683

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed November 13, 1922. Serial No. 600,564.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism, especially adapted for railway draft riggings, wherein is obtained high frictional capacity, by means of simple and economical construction.

More specifically, the object of the invention is to provide a mechanism of the character indicated wherein is employed a friction plunger with which cooperate gripping elements to thereby produce a graduated friction resistance.

In the drawings forming a part of this specification, Figure 1 is a horizontal longitudinal sectional view of a portion of a railway draft rigging showing my improvements in connection therewith, parts being broken away in order to better accommodate the figure on the sheet. Figure 2 is a vertical transverse sectional view of the shock absorbing mechanism proper taken on the line 2—2 of Figure 1. Figure 3 is a vertical transverse sectional view, parts broken away, the section corresponding to the line 3—3 of Figure 1. Figure 4 is a view similar to Figure 1 illustrating another embodiment of the invention. Figure 5 is a front end elevation of the shock absorbing mechanism proper shown in Figure 4. Figure 6 is a vertical transverse sectional view of the mechanism shown in Figure 4 and corresponding to the section line 6—6 thereof. And Figure 7 is a detail perspective of one of the friction gripping elements employed in the construction shown in Figure 4.

Referring first to the construction illustrated in Figures 1, 2 and 3, 10—10 denote channel draft sills of a car underframe, to the inner faces of which are secured front stop lugs 11 and rear stop lugs 12. A portion of a drawbar is indicated at 13, the same being operatively associated with a hooded cast yoke 14 within which is disposed the shock absorbing mechanism proper, hereinafter described, and a front follower 15. The yoke and parts therewithin are supported in operative position by a detachable saddle plate 16.

The improved shock absorbing mechanism proper, as shown, comprises a combined friction shell and spring cage casting A; a main spring resistance B; a friction plunger C; a pair of friction gripping wedge elements D—D; a pair of secondary springs E—E; a retainer bolt F; a pair of tension bolts G—G; a pair of spring follower blocks H—H; and a main spring follower J.

The casting A, as shown, is of generally rectangular cross section having top and bottom walls 17—17 and side walls 18—18, the latter being provided on their inner sides with inwardly extended enlargements 19—19, each of the latter having a wedge face 20 thereon, the latter converging inwardly of the shell. The inner ends of the enlargements 19 provide transverse shoulders 21 forming bearings for the front ends of the secondary springs E. The rear ends of said springs E rest upon the blocks H, each of which has a front overhanging slotted flange 22 beneath which is hooked the head end of the respective tension bolt G, the nut ends of the latter being seated within suitable sockets provided in the gripping elements D. The bolts G not only transmit the spring pressure to the elements D but, in addition, serve as a means for adjusting the pressure exerted by the springs E. The required adjustment is made by either tightening or loosening the nut of the corresponding bolt.

Rearwardly of the shell proper, the casting A is necked inwardly to provide a spring cage or casing 23, the cage acting as a centering means for the main spring. The rear end of the casting A is formed with a vertical integral wall 24 laterally extended and suitably braced to adapt it to function as the rear follower of the mechanism in conjunction with the stop lugs 12.

The two friction gripping elements D are of like construction, each having on its outer side an inclined wedging face 25 cooperable with the corresponding shell wedge face 20. On its inner side, each element D is provided with a longitudinally extending flat friction surface 26, the latter being converged slightly inwardly of the shell. The front ends 27 of the elements D are normally positioned slightly inwardly of the front end of the casting A so as to allow for slight outward movement of the elements D, due to the differential action which occurs in the operation of the mechanism, as hereinafter described.

The plunger C preferably consists of a heavy cast block suitably cored and having an outer flat transverse bearing face 28 bearing against the front follower 15. The sides of the plunger C are formed to provide longitudinally extending flat friction surfaces 29—29 which are slightly converged inwardly of the shell so as to render the plunger C slightly tapered. The plunger C is normally extended inwardly beyond the inner ends of the gripping elements D and bears upon the spring follower J. The main spring B is interposed between said follower J and the rear end of the casting A.

The operation of the mechanism under compression, assuming a buffing stroke of the drawbar, is as follows. As the drawbar moves toward the casting A, the plunger C is compelled to travel in unison therewith. This action of the plunger is directly resisted by the spring B. It is further resisted by the friction generated between said plunger and the gripping elements D, it being observed that the elements D are always urged in a direction inwardly of the casting under the influence of the secondary springs E which are placed under an initial compression. This friction will be gradually augmented, due to the drag which is exerted on the friction elements D tending to pull the latter inwardly with the plunger C and further by reason of the taper of the plunger C which causes the gripping elements D to move slightly outwardly by climbing up the wedge faces 20 of the shell. In release, upon discontinuance of the actuating force, the stored up energy of the main spring B will exceed the capacity of the two springs E—E and hence is enabled to force the plunger C even with the gripping elements D stuck thereto in an outward direction sufficiently to loosen the grip of the elements D on the plunger C and thereafter permit the plunger C to be forced the remainder of the distance outwardly to its normal full release condition. It will further be observed that a certain amount of drag or dampening effect will be exerted by the elements D on the plunger C by the release action, thus minimizing undesirable shocks sometimes occurring in friction mechanisms during the release action.

Referring next to the construction illustrated in Figures 4 to 7, inclusive, the friction mechanism therein shown comprises a combined friction shell and spring cage casting A'; twin spring resistances B'—B'; a friction plunger C'; two wedge-friction gripping elements D'—D'; and two heavy tension bolts G'—G'.

The casting A' is of rectangular cross section having, at its front end, inwardly extending lateral enlargements 119—119 each provided with a wedge face 120, the latter converging inwardly of the shell. The inner ends of the enlargements 119 extend transversely to provide shoulders 121 against which normally bear the laterally extended flanges 50 formed integral with the plunger C' at the inner end of the latter. The laterally extended flanges 50 function as a spring follower for the forward ends of the twin spring resistance B'. The rear ends of said spring resistance B' bear upon a heavy follower 51 located within the casting A' at the rear thereof and normally slightly spaced from the rear wall of the casting A'.

The friction plunger C', at its front end 128, bears upon the front follower 116. The shank of said plunger C' is provided with longitudinally extending flat friction surfaces 129—129 which are converged slightly inwardly of the shell.

The two gripping elements D', located on opposite sides of the plunger C', are each of like construction, and each has a wedge face 125 cooperable with the corresponding wedge face 120. The element D' further has, on its inner side, a longitudinally extending flat friction surface 126 cooperable with the corresponding adjacent friction surface 129 of the plunger C'.

The heavy tension bolts G' are anchored at their forward ends within suitable sockets provided in the gripping elements D' and at their rear ends are anchored behind the heavy follower 51, as clearly shown in Figure 4, it being observed that the elements D', enlargements 119, flanges 50 and follower 51 are suitably apertured to accommodate the shanks of the bolts G'.

In the operation of the mechanism just described, friction is generated between the plunger C' and the elements D' in the same manner as in the structure illustrated in Figures 1, 2 and 3. The plunger C' is obviously directly resisted by both springs B' but in this instance, the tension exerted upon the gripping elements D', instead of being dependent upon secondary or additional springs, is obtained from the main spring resistance B' reacting through the tension bolts G'. In this connection, it will be observed that the tension exerted on the elements D' is gradually increased during the compression stroke and will be proportional to the degree of compression of the spring resistance B'.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a friction shell having inwardly converged wedge faces; of a pressure-transmitting friction plunger tapered toward its inner end; a main spring resistance; friction gripping elements interposed between said plunger and said wedge faces of the shell; additional spring resistance elements; and spring pressure-transmitting means coacting with said additional spring resistance elements and friction gripping elements, said last named means being adapted to hold said gripping elements assembled with the shell.

2. In a friction shock absorbing mechanism, the combination with a friction shell having inwardly converged wedge faces; of a pressure-transmitting friction plunger; friction gripping elements interposed between said plunger and the wedge faces of the shell; means engaging said elements for retaining the same within said shell; a main spring resistance for the plunger; and yielding means coacting with said retaining means for normally urging said gripping elements inwardly of the shell and laterally against the friction plunger.

3. In a friction shock absorbing mechanism, the combination with a friction shell having inwardly converged wedge faces; a pressure-transmitting plunger having longitudinally extending friction surfaces converging inwardly of the mechanism for their entire length; gripping elements interposed between the friction surfaces of said plunger and the wedge faces of the shell, said gripping elements co-operating with said converging surfaces of the plunger at all times during a compression stroke; spring means for directly resisting longitudinal movement of said plunger with respect to the shell; and means for imposing a yielding tension on said gripping elements in a direction inwardly of the shell and laterally against the friction plunger, said means being independent of the resistance for the plunger.

4. In a friction shock absorbing mechanism, the combination with a friction shell having inwardly converged wedge faces; a pressure-transmitting friction plunger; a spring resistance for directly resisting movement of said plunger with respect to the shell; friction gripping elements interposed between said plunger and the wedge faces of the shell; and independent means for each gripping element normally yieldingly urging the gripping element inwardly of the shell and laterally toward the plunger; and means for adjusting said last named means.

5. In a friction shock absorbing mechanism, the combination with a friction shell having inwardly converged wedge faces; a pressure-transmitting friction plunger; a spring resistance for directly resisting movement of said plunger with respect to the shell; friction gripping elements interposed between said plunger and the wedge faces of the shell; and independent means for each gripping element normally yieldingly urging the gripping element inwardly of the shell and laterally toward the plunger, each of said last named means comprising a secondary spring and a tension bolt therefrom to the gripping element.

In witness that I claim the foregoing I have hereunto subscribed my name this 23rd day of October, 1922.

JOHN F. O'CONNOR.